United States Patent [19]
Nishiyama

[11] Patent Number: 5,665,226
[45] Date of Patent: Sep. 9, 1997

[54] SUBSTANCE COLLECTING APPARATUS FOR PRECIPITATION CLASSIFYING DEVICE

[75] Inventor: Yugo Nishiyama, Susono, Japan

[73] Assignee: Yazaki Corporation, Tokyo, Japan

[21] Appl. No.: 510,304

[22] Filed: Aug. 2, 1995

[30] Foreign Application Priority Data

Aug. 3, 1994 [JP] Japan .................................. 6-182351

[51] Int. Cl.$^6$ .............................. B01D 17/12; B03B 5/00
[52] U.S. Cl. .......................... 210/141; 137/571; 209/173; 210/257.1
[58] Field of Search ............................... 210/167, 257.1, 210/513, 521, 800, 144, 143, 195.1, 250; 137/571, 572, 590, 592, 337, 563, 565; 422/62, 101, 103; 209/175.2, 173, 208

[56] References Cited

U.S. PATENT DOCUMENTS

| | | |
|---|---|---|
| 1,559,937 | 11/1925 | Chance . |
| 1,894,020 | 1/1933 | Chance . |
| 2,211,068 | 8/1940 | McDonald ........................ 137/572 |
| 2,222,030 | 11/1940 | Hague ........................... 137/571 |

*Primary Examiner*—Joseph W. Drodge
*Attorney, Agent, or Firm*—Nikaido Marmelstein, Murray & Oram LLP

[57] ABSTRACT

The object of the present invention is to provide a substance collecting apparatus for a precipitation classifying device which is capable of automatically transmitting the classified substances to a next process in a sterile atmosphere even during a substance classifying operation is being performed, and in order to attain the object, the substance collecting apparatus comprises a pipe 15 whose one end is connected with a partitioned part 6 of a classifying tank side by way of a first electrovalve, while the other end is diverged into two ways, one of which is connected with a liquid-substance separating tube and having a third electrovalve 23 in the halfway thereof, whereas the other is connected with an exhausting side of a pump 24 and having a second electrovalve 22. The intake side of the pump 24 is further connected with a liquid reservoir tank 25, having in the halfway of the first pipe 15 a liquid flux regulating valve 32. The far end of a second pipe 16 connected with the upper side of the liquid-substance separating tube 29 is submerged in the liquid reservoir tank 25, and a vertically lower portion of the liquid-substance separating tube 29 is connected with a third pipe 17, in which a fourth electrovalve 30 and a fifth electrovalve 31 are disposed having an interval therebetween.

5 Claims, 6 Drawing Sheets

FIG. 7 PRIOR ART

SUBSTANCE COLLECTING APPARATUS FOR PRECIPITATION CLASSIFYING DEVICE

BACKGROUND OF THE INVENTION

1. Field of the Invention

The present invention relates to a substance collecting apparatus for a precipitation classifying device.

2. Description of the Prior Art

A precipitation classifying device is an equipment for classifying various substances within a liquid into different groups by the size and/or density of each, taking advantage of the difference of the sedimentation rates of the respective substances.

As an example of the equipment of this kind, there has been provided a device as disclosed in Patent Publication Heisei No. 3-99, in which various substances dispersed in a liquid and including the ones to be classified are put in a container which is provided with a piston so that its bottom can be vertically slid up and down, and after generating a rising flow with no turbulent flow therein by raising the bottom portion of the container at a predetermined speed, an accurate classification can be obtained through making the particles, whose sedimentation rate is faster than the bottom raising speed, overflown from the upper brim of the container.

Further, there have also been provided devices as disclosed in Patent Application Laid-Open No. Showa 59-196760 and Patent Application Laid-Open No. Heisei 3-178352, wherein the substances can be classified into two groups by adjusting the density of the liquid in which they are dispersed, so that the substance having a density larger than that of the liquid is precipitated, and the substance having smaller density than the same is floated.

However, it is to be noted that many of these methods are for classifying substances into only two groups, but not for classifying into a plurality of groups, for example, as for classifying cell masses in all growing stages or the like. Further, since a turbulent flow is generated in a tube, a degree of precision in the classification suitable for classifying substances such as the cell masses can not be expected.

In order to solve this problem, the applicants have provided a precipitation classifying device, as disclosed in Patent Application Laid-Open No. Heisei 5-125743, which can classify a large quantity of substances to be classified into a large number of groups, wherein the substances to be classified include various types of groups in all growing stages like cell masses.

Figure 7:
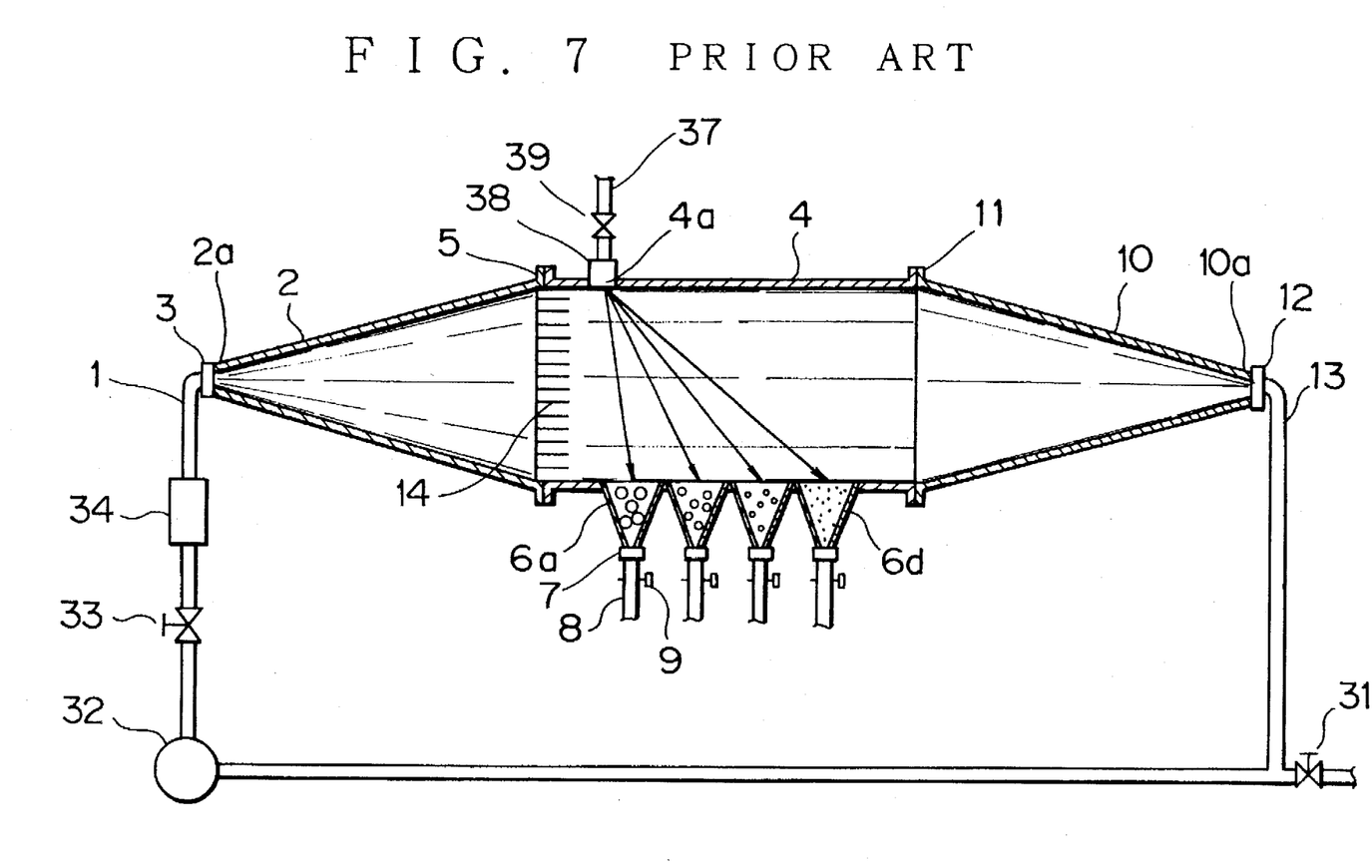
FIG. 7 is a sectional view of a prior precipitation classifying device which has been applied by the same applicants of the present invention.

FIG. 7 shows a side sectional view of the above device, in which reference numeral 4 denotes a cylindrical classifying tank whose internal surface is substantially smooth and the axial direction thereof is set horizontally. At one opening end of the classifying tank 4, a first conical pipeline 2, which is gradually narrowed in the outside direction and having an opening tip 2a at the far end thereof, is fixed by means of a screw or the like taking advantage of a flange 5. Observing from the tip 2a side, this first conical pipeline 2 is gradually expanded toward the classifying tank 4 to the extent at which the liquid is not converted to a turbulent flow.

Further, at the other opening end of the classifying tank 4, a second conical pipeline 10, which is gradually narrowed in the outside direction and having an open tip 10a at the far end thereof, is also mounted by means of a screw or the like taking advantage of a flange 11. Observing from the open tip 10a, this second conical pipeline 10 is also gradually expanded toward the classifying tank 4 to the extent at which the liquid is not converted to a turbulent flow.

Removably mounted at the open tip 2a of the first conical pipeline 2 is a pipe 1 by means of a union 3, and equally a pipe 13 is removably mounted at the tip 10a of the second conical pipeline 10 by way of a union 12. The pipe 13 goes round to be connected with the pipe 1, and within the thus connected line, a drain 31, a pump 32, a flux regulating valve 33 and a flow meter 34 are also connected.

Further, there is also disposed a liquid flow rectifying grid 14 near the above one opening end of the classifying tank 4, which rectifying grid 14 being formed of an extremely thin material and removably mounted in an inserting mode. The liquid flow rectifying grid 14 is an apparatus for preventing the liquid flowing in from the first conical pipeline 2 from converting to a turbulent flow.

In addition, there is provided a slot 4a for throwing substances to be classified thereinto near the above opening end of the classifying tank 4, and a pipe 37 extending in the vertical direction is connected thereto by way of a union 38. In the intermediate portion of the pipe 37, there is provided a ball valve (on/off valve) 39, and at the uppermost end thereof, a container (not shown) including liquid having tiny substances such as cell masses to be classified is connected.

Further, at the lowest portion of the classifying tank 4, there are provided a plurality of tubular partitioned parts 6 (6a, 6b, . . . ), each of which is narrowed in the downward direction, and connected with a half union 7 for enabling an easy removal of a tube 8 made of a silicon or the like. By the way, an opening/closing operation of the tube 8 is done by each of pinch-cocks 9. The other end of the tube 8 is each connected with another apparatus that performs an adjacent next process.

The operation of the above device is as follows.

First, the device is filled with liquid, which is circulated within the device by the pump 32. The flowing direction of the liquid within the classifying tank 4 is from left to right, and the flowing speed thereof in the same tank is controlled by the flux regulating valve 33 disposed in the downstream of the pump 32 and can be checked by a flow meter 34 disposed in the downstream of the flux regulating valve 33.

The supplied cell masses freely drop down through the pipe 37 into the classifying tank 4. When the cell masses have reached inside the classifying tank 4, the dropping speed thereof have reached to the maximum level, and then drop down at the same speed thereafter. In the classifying tank 4, since the liquid flows at a predetermined speed in the horizontal direction, the cell masses which have entered into the tank 4 drop down drawing an oblique downward line to reach to the partitioned parts 6a, 6b, . . . , so as to be classified therein.

At this stage, the larger cell masses having the fastest maximum dropping speed drop down into the leftmost partitioned section 6a, and those having the minimum dropping speed drop down into the rightmost section 6. This way, the cell masses can be classified in accordance with the growing stage of each thereof. The cell masses dropped into the partitioned section 6 are respectively transferred to the adjacent next process through tubes 8.

However, the above-mentioned prior precipitation classifying devices are all made such that the substance collecting operation is done by opening and/or closing the tube with a pinch cock disposed at the opening outlet, so that for collecting the substances, the device has to be stopped functioning, the pinch cock has to be opened by all manual operations in order to take out the entire substances together with the liquid, and it is quite clear that it is not only impossible to collect the substances automatically during the classifying operation, but there is also possibility of contamination by viruses or the like in a step for transmitting the thus extracted substances.

SUMMARY OF THE INVENTION

The present invention has been made to solve the above-mentioned problems, and accordingly, it is an object of the present invention to provide a substance collecting apparatus for a precipitation classifying device which is capable of automatically transmitting the classified substances to an adjacent next process in a sterile atmosphere even during a substance classifying operation is being performed.

In order to attain the above object, the present invention provides a substance collecting apparatus for a precipitation classifying device provided with a classifying tank and a partitioned part, which substance collecting apparatus comprising: a reservoir tank for accumulating a liquid which is same as that in a classifying tank, a liquid-substance separating tube for separating the liquid and the substances dispersed therein, a first pipe whose one end is connected with the partitioned part disposed at the lower part of the classifying tank and the other end is diverged in the halfway into two ways, one of which is connected with the lower part of the liquid-substance separating tube, while the other end is submerged in the liquid of the reservoir tank by way of a pump, a second pipe whose one end is connected with the upper part of the liquid-substance separating tube, while the other end is submerged in the liquid of the reservoir tank, a third pipe which is connected with a substance collecting open outlet of the liquid-substance separating tube, a first electrovalve disposed in the first pipe between the diverging point thereof and the partitioned part of the classifying tank, a second electrovalve disposed between the diverging point and the pump, a third electrovalve disposed in the first pipe between the diverging point and the liquid-substance separating tube, a fourth and a fifth electrovalves disposed in the third pipe having an interval therebetween, and a control means for controlling the opening/closing operations of the respective electrovalves and also functional movement of the pump.

The above substance collecting apparatus for a precipitation classifying device according to the present invention is further constructed such that the first to third pipes are all made of silicon tubes, and the opening/closing operations of the first to fifth electrovalves are all controlled by pressing these silicon tubes and releasing the pressed states thereof.

Still further, the substance collecting device for a precipitation classifying device according to the present invention is constructed such that there is a flux regulating valve in the first pipe between the reservoir tank and the second electrovalve.

Since the present invention is constructed as above, classified substances are collected by opening the first electrovalve and simultaneously closing the second and third electrovalves by means of the control means.

The substances classified at the partitioned part of the classifying tank drop down into the first pipe to pass through the first electrovalve, and are accumulated near the diverging point which is a space between the closed second and third electrovalves.

When the accumulated quantity of the substances has reached to a predetermined level, then the first electrovalve is closed and simultaneously the second and third electrovalves are opened, and the pump is also activated.

By this operation, the substances accumulated near the diverging point of the first pipe are transmitted to the liquid-substance separating tube together with the liquid sent thereto from the reservoir tank. At this stage, the liquid in the classifying tank is intercepted by the first electrovalve so as not to flow into the liquid-substance separating tube.

In the liquid-substance separating tube, the liquid and the substance transmitted thereto are separated from each other, and thereafter the liquid is sent back to the reservoir tank through the second pipe, while the substances drop into the third pipe which is connected to the substance collecting open outlet of the liquid-substance separating tube. At this stage, if the fifth electrovalve is closed and simultaneously the fourth electrovalve is opened by the control means, the substances are accumulated in the third pipe at the fifth electrovalve.

When the substances are sufficiently accumulated, the substances only can be sent to the adjacent next process by opening the fifth electrovalve and simultaneously closing the fourth electrovalve, and then the process returns to the first stage wherein the first electrovalve is opened and the second and third electrovalves are closed simultaneously.

Since the first to third pipes are all made of silicon tubes, and the opening/closing operations of the first to fifth electrovalves are controlled by pressing these silicon tubes and releasing the pressed states thereof, the whole procedure can be performed in a sterile condition.

Further, since a flux regulating valve is disposed in the first pipe between the reservoir tank and the second electrovalve, the liquid flow can be properly controlled within the liquid-substance separating tube, thereby enabling an accurate separation of the liquid and substance.

Other features and advantages of the invention will be apparent from the following description taken in connection with the accompanying drawing.

DETAILED DESCRIPTION OF THE PREFERRED EMBODIMENTS

An embodiment of the present invention will now be explained in reference to the appended drawings, and the reference numerals used for explaining the prior art will be used for corresponding or similar parts in the present invention.

Figure 1:
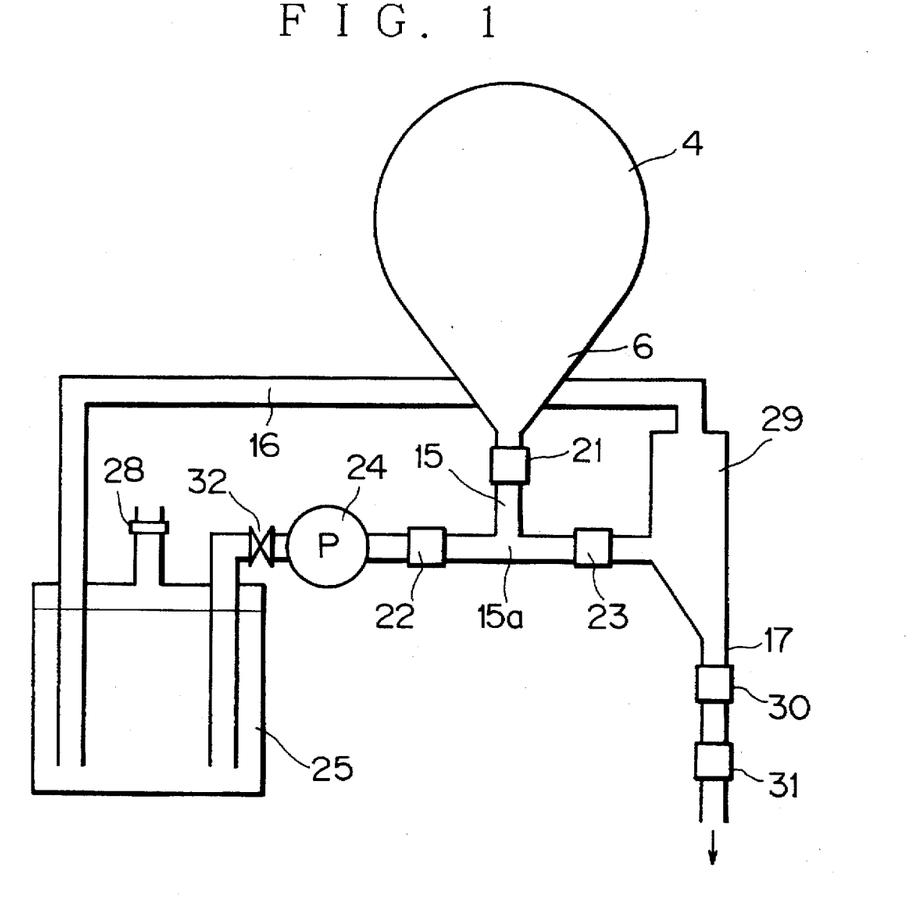
FIG. 1 is an illustration showing a typical embodiment of a substance collecting apparatus for a precipitation classifying device of the present invention.

FIG. 1 is an illustration showing a typical embodiment of the substance collecting apparatus for a precipitation classifying device of the present invention, wherein provided at a collecting open outlet of the partitioned part 6 disposed at the lower part of the classifying tank 4 is a first pipe 15, which is vertically settled as shown in the drawing, and is diverged by a tee or the like in the halfway thereof.

Figure 2A:
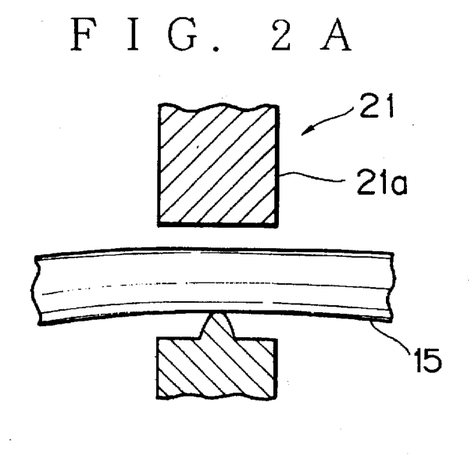
FIGS. 2A and 2B are illustrations showing together the operation of an electrovalve adopted in the present invention, wherein FIG. 2A indicates an opened state, while FIG. 2B indicates a closed state thereof.
Figure 2B:
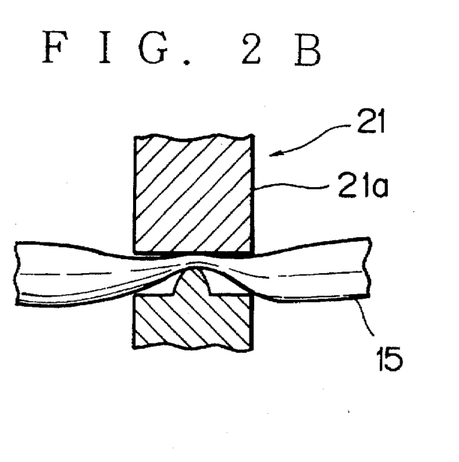

In the first pipe 15 starting from the substance collecting open outlet of the partitioned part 6 to the diverging point 15a, there is provided a first electrovalve 21. The electrovalve 21 is arranged in such a way as to surround the first pipe 15 as shown in FIG. 2A, and squeeze it by means of a piston 21a from outside to close as shown in FIG. 2B, whereby a contamination by virus or the like will be completely avoided as the electrovalve does not have a direct contact with liquid in the first pipe 15.

One end of the diverging point 15a of the first pipe 15 having a tee or the like is connected to the liquid-substance separating tube 29, and provided in the halfway thereof is a third electrovalve 23.

The inner diameter of the liquid-substance separating tube 29 at a connected portion with the electrovalve 23 is more than twice as long as that of the first pipe 15, and one part of the tube 29 starting from the connected portion to the upwardly extending portion is more than four times as long as the inner diameter of the pipe 15, wherein the uppermost portion of the tube 29 is connected with a second pipe 16 made of a silicon or the like.

The other end of the second pipe 16 is submerged in the liquid accumulated in the reservoir tank 25, which liquid being same as that in the classifying tank 4.

The liquid-substance separating tube 29 is gradually narrowed around the vertical lower portion thereof for preventing the substances from being stuck, and the third pipe 17 made of a silicon tube is connected therewith at the lowest portion thereof.

In the third pipe 17, the fourth electrovalve 30 and the fifth electrovalve 31 are disposed having an interval therebetween, and the substances can be taken out of the lowest part of the pipe 17 by controlling these electrovalves to send them to the adjacent next process.

Further, the opposite end of the diverging portion 15a of the first pipe 15 is connected to the exhausting side of the pump 24, and provided in the midway thereof is a second electrovalve 22. The intake side of the pump 24 is connected with the reservoir tank 25 by way of the pipe 15, and a free end portion of the pipe 15 is submerged in the tank 25, and disposed in the middle of the pipe 15 is a flux regulating valve 32. It is to be noted that the reservoir tank 25 is provided with a filter 28 for preventing dust, virus and so on from entering thereto.

An operation of the device will now be explained hereinafter.

Figure 3A:
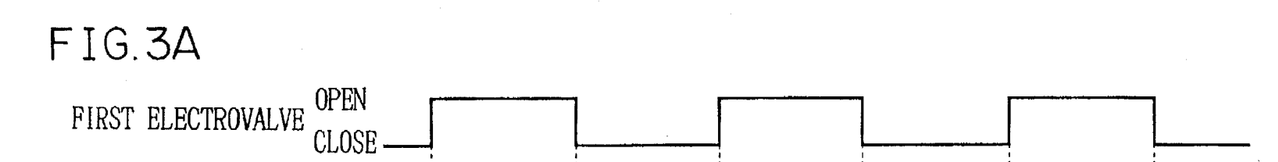
FIG. 3 is a time chart showing mutual movements of the electrovalves and a pump.
Figure 3B:
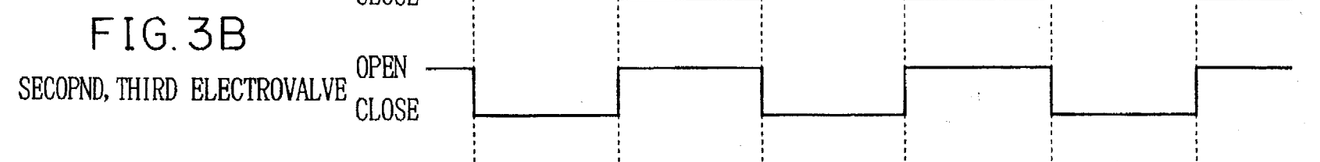
Figure 3C:
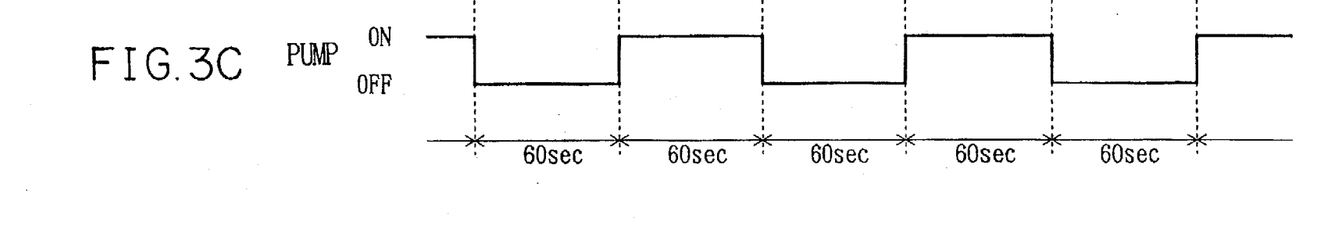

The first, second and third electrovalves 21, 22, 23 and a pump 24 are switched on and off along the timing shown in FIG. 3. First, when the first electrovalve 21 is opened, the second and third electrovalves 22 and 23 are closed simultaneously, and the pump is kept in a stopped state. At this stage, either the fourth electrovalve 30 or the fifth electrovalve 40 is definitely put in a closed state.

Figure 4:
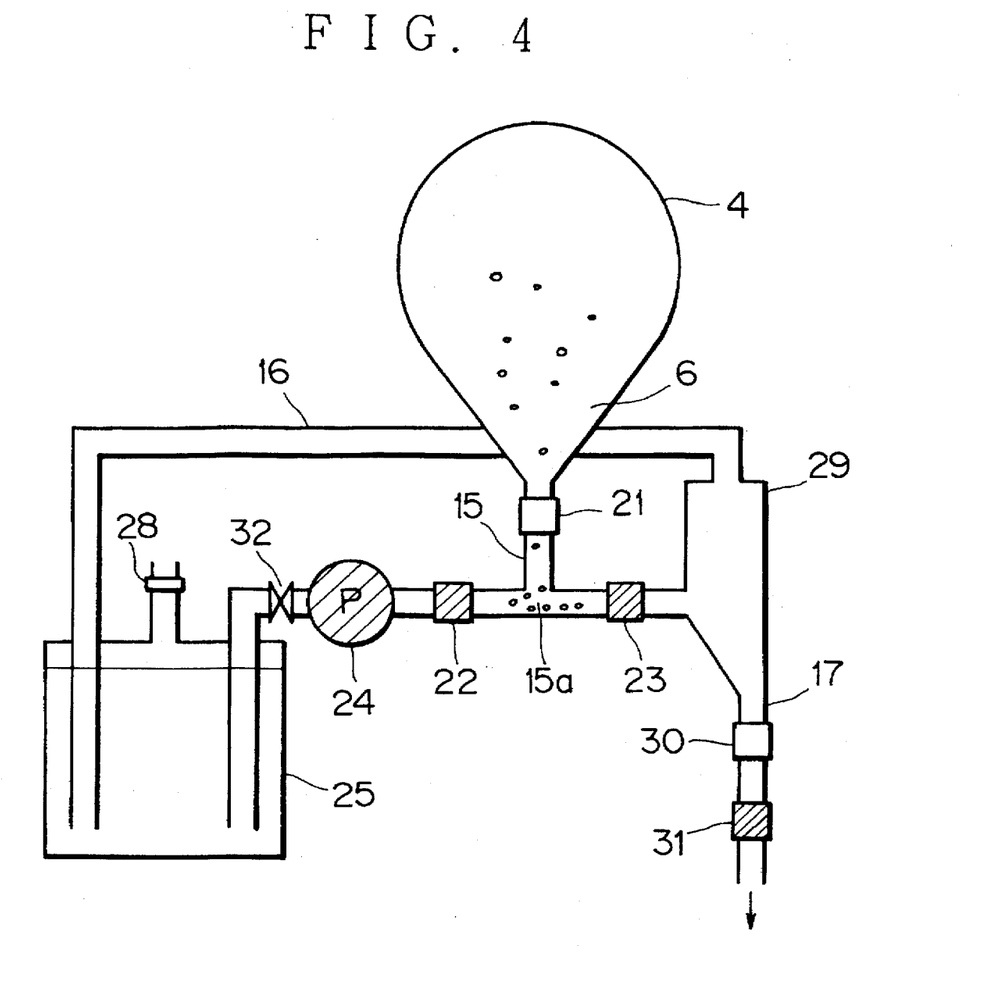
FIG. 4 is an illustration showing a state in that the substances are accumulated near the diverging point of the first pipe.
Figure 5:
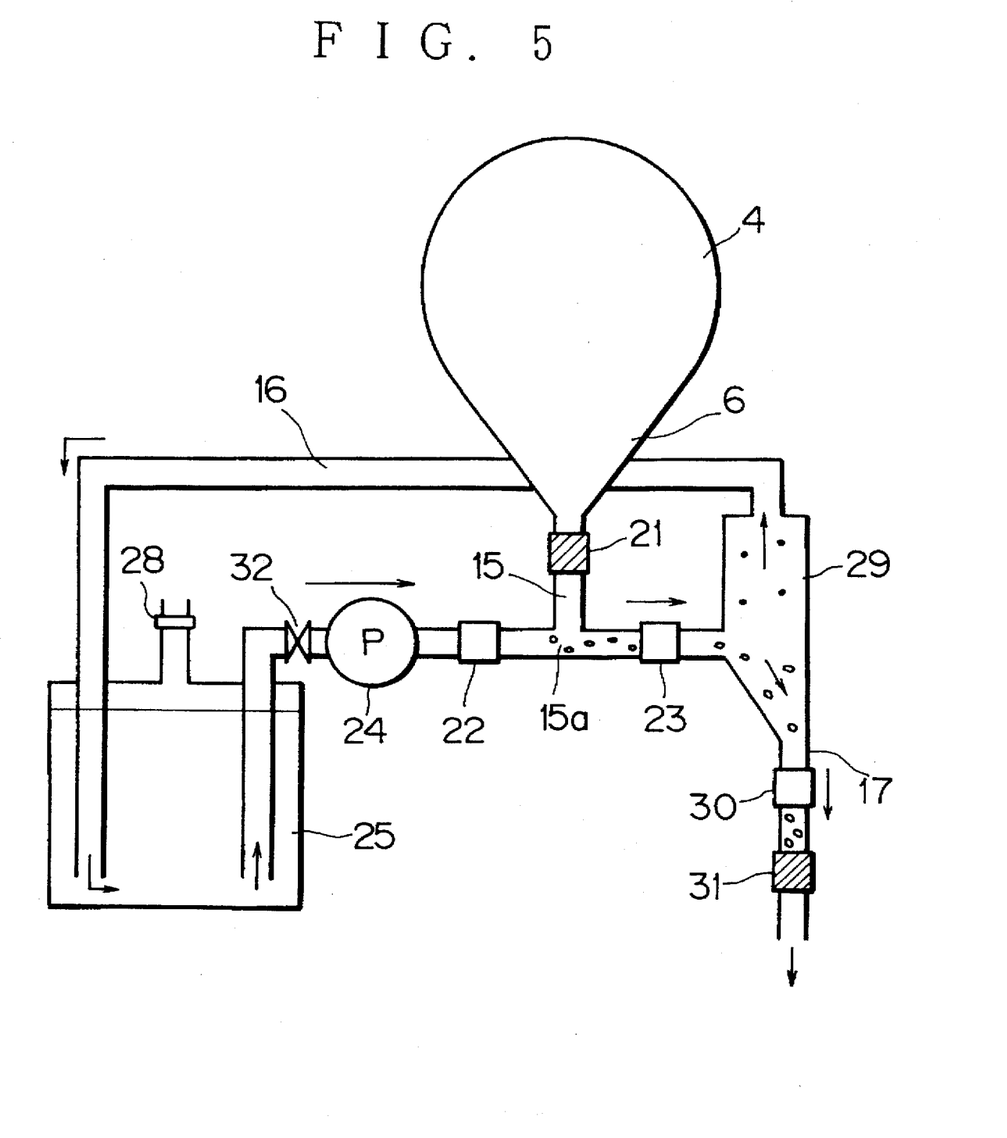
FIG. 5 is an illustration showing a state in that the substances in the first pipe are transmitted to the liquid-substance separating tube.

Here, the substances dropped to the partitioned part 6 of the classifying tank 4 after being classified are accumulated near the diverging point 15a of the first pipe 15 passing through the first electrovalve 21. Thereafter, as shown in FIG. 5, after a time lapse of 30 seconds to 10 minutes, the first electrovalve 21 is closed and at the same time the second and third electrovalves 22 and 23 are opened, and the pump 24 is put in an operating state.

By this operation, the substances dropped and accumulated near the diverging point 15a are mixed with the liquid supplied from the reservoir tank 25 to be sent to the liquid-substance separating tube 29.

At this stage, since the first electrovalve 21 is closed, the liquid activated by the pump 24 does not affect inside the classifying tank 4, while the liquid within the classifying tank 4 would not flow into the liquid-substance separating tube 29 either.

Further, since the upward flowing speed of the liquid is controlled in the liquid-substance separating tube 29 by the flux regulating valve 32 to be under the maximum precipitation speed thereof, the substances therein drop down, and the liquid is overflown and sent back to the reservoir tank 25.

Figure 6:
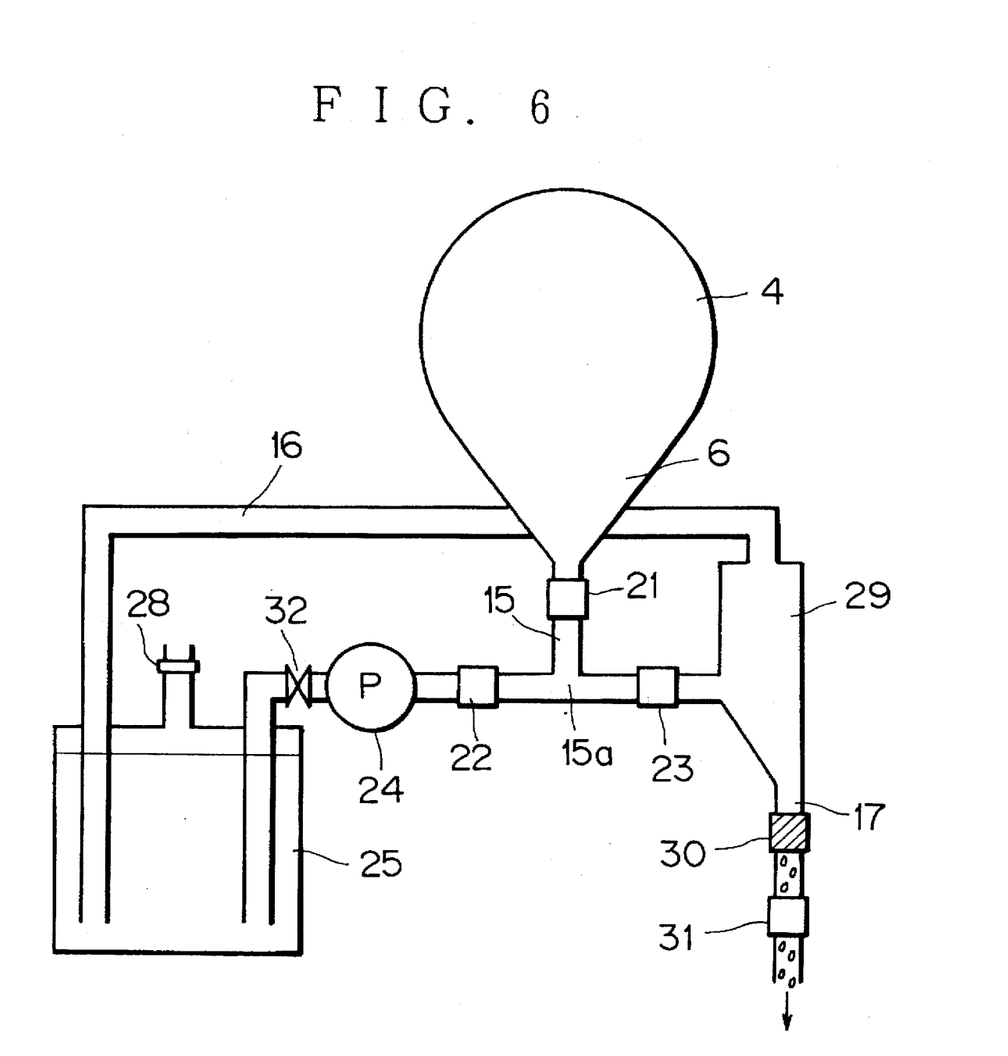
FIG. 6 is an illustration showing a state in that the substances separated from the liquid by means of electrovalves in the liquid-substance separating tube are transmitted to the adjacent next process.

The substances dropped down in the liquid-substance separating tube 29 are accumulated in the third pipe 17 between the electrovalves 30 and 31 by opening the forth electrovalve 30 and closing the fifth electrovalve 31, so that as shown in FIG. 6 the thus accumulated substances can be taken out to be sent to the adjacent next process by closing the fourth electrovalve 30 and opening the fifth electrovalve 31.

Still further, after a predetermined time (30 seconds to 10 minutes), the first electrovalve 21 is opened, and the second and third electrovalves 22 and 23 are closed, while the pump is put in a stopped state. By repeating these procedures, the classified substances can be sent to the next adjacent process one after another. It is to be noted that the pump 24 and the first to fifth electrovalves respectively 21, 22, 23, 30 and 31 are all controlled by a control means such as a sequencer or the like (not shown).

By taking these procedures, the substances like cell masses classified in the classifying tank can be automatically sent to the next adjacent process one after another, but without being contaminated by virus or the like even during the classifying operation.

[Effect of the Invention]

As explained heretofore, according to the present invention classified substances can be automatically transmitted to an adjacent next process even during the classifying operation thereof, wherein since it is enabled to transmit the substances by an opening/closing operation of a silicon tube by means of electrovalves, the substances can be collected in a sterile condition.

Further, as a flux regulating valve is disposed in the first pipe between the second electrovalve and the reservoir tank, the liquid flow into the liquid-substance separating tube can be properly adjusted, thereby enabling an accurate separation of substances from the liquid.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A solid substance collecting apparatus for a precipitation classifying device, comprising:

a classifying tank for holding a liquid containing solid substances dispersed therein, a partition part disposed at a lower part of the classifying tank, a liquid-substance separating tube for separating the liquid and the solid substances dispersed therein, a reservoir tank for accumulating the liquid, a first pipe having one end and first and second other ends which diverge from a diverging point, wherein the one end is connected with the partition part, the first other end is connected with a lower part of the liquid-substance separating tube, and the second other end is in contact with the liquid in the reservoir tank, a second pipe having one end connected with an upper part of the liquid-substance separating tube and an other end in contact with the liquid of the reservoir tank, a third pipe having one end connected with a substance collecting open outlet of the liquid-substance separating tube, a pump connected to the first pipe and disposed between the reservoir tank and the diverging point, a first electrovalve in reversibly closing relationship with the first pipe and disposed between the diverging point and the partitioned part, a second electrovalve in reversibly closing relationship with the first pipe and disposed between the diverging point and the pump, a third electrovalve in reversibly closing relationship with the first pipe and disposed between the diverging point and the liquid-substance separating tube, fourth and fifth electrovalves, each in reversibly closing relationship with the third pipe, having an interval therebetween, and control means for controlling the reversibly closing relationships of the respective first, second, third, fourth and fifth electrovalves and movement of the pump.

2. A solid substance collecting apparatus as claimed in claim 1, wherein the first, second and third pipes comprise silicon, and the control means for controlling the reversibly closing relationships comprises a piston which squeezes one of the first, second and third pipes to close the respective pipe and thereafter releases the closed pipe to open the pipe.

3. A solid substance collecting apparatus as claimed in claim 1, further comprising a flux regulating valve in contact with the first pipe and disposed between the reservoir tank and the second electrovalve.

4. A solid substance collecting apparatus as claimed in claim 1, wherein the control means controls the first, second and third electrovalves such that when the first electrovalve is opened, the second and third electrovalves are simultaneously closed, and when the first electrovalve is closed, the second and third electrovalves are simultaneously opened.

5. A solid substance collecting apparatus as claimed in claim 1, wherein the control means controls the fourth and fifth electrovalves such that when the fourth electrovalve is opened, the fifth electrovalve is simultaneously closed, and when the fourth electrovalve is closed, the fifth electrovalve is simultaneously opened.

* * * * *